(12) United States Patent
Sun et al.

(10) Patent No.: US 11,150,140 B2
(45) Date of Patent: *Oct. 19, 2021

(54) INSTRUMENTED SUBSTRATE APPARATUS FOR ACQUIRING MEASUREMENT PARAMETERS IN HIGH TEMPERATURE PROCESS APPLICATIONS

(71) Applicant: KLA-Tencor Corporation, Milpitas, CA (US)

(72) Inventors: Mei Sun, Milpitas, CA (US); Vaibhaw Vishal, Fremont, CA (US)

(73) Assignee: KLA Corporation, Milpitas, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 15/277,753

(22) Filed: Sep. 27, 2016

(65) Prior Publication Data

US 2017/0219437 A1 Aug. 3, 2017

Related U.S. Application Data

(60) Provisional application No. 62/290,153, filed on Feb. 2, 2016.

(51) Int. Cl.
*G01K 1/20* (2006.01)
*G01K 1/02* (2021.01)
(Continued)

(52) U.S. Cl.
CPC .............. *G01K 1/20* (2013.01); *G01K 1/026* (2013.01); *G01K 7/02* (2013.01); *G01K 7/16* (2013.01);
(Continued)

(58) Field of Classification Search
CPC ....................................................... G01K 1/20
(Continued)

(56) References Cited

U.S. PATENT DOCUMENTS

| 7,893,510 B2 | 2/2011 | Wienand et al. |
| 2005/0199878 A1* | 9/2005 | Arao ................... H01L 27/1214 257/66 |

(Continued)

FOREIGN PATENT DOCUMENTS

| JP | 2006513583 A | 4/2006 |
| JP | 2007208249 A | 8/2007 |
| JP | 2012163525 A | 8/2012 |

OTHER PUBLICATIONS

English translation of Renken (JP2007208249). acessed from espacenet.com Dec. 18, 2019.*

*Primary Examiner* — Nimeshkumar D Patel
*Assistant Examiner* — Jean F Morello
(74) *Attorney, Agent, or Firm* — Suiter Swantz pc llo (57) ABSTRACT

An apparatus includes a substrate, a nested enclosure assembly including an outer enclosure and an inner enclosure, wherein the outer enclosure encloses the inner enclosure and the inner enclosure encloses at least the electronic assembly. An insulating medium is disposed within a cavity between the outer surface of the inner enclosure and the inner surface of the outer enclosure and the system includes a sensor assembly communicatively coupled to the electronic assembly. The sensor assembly includes one or more sensors that are configured to acquire one or more measurement parameters at one or more locations of the substrate. The electronic assembly is configured to receive the one or more measurement parameters from the one or more sensors.

34 Claims, 8 Drawing Sheets

(51) Int. Cl.
  *G01K 13/00*   (2021.01)
  *G01K 7/02*    (2021.01)
  *G01K 7/16*    (2006.01)
  *G01L 9/02*    (2006.01)
  *G01T 1/16*    (2006.01)
  *G01T 7/00*    (2006.01)

(52) U.S. Cl.
  CPC .............. *G01K 13/00* (2013.01); *G01L 9/025* (2013.01); *G01T 1/16* (2013.01); *G01T 7/00* (2013.01)

(58) Field of Classification Search
  USPC .......................................................... 73/708
  See application file for complete search history.

(56) References Cited

U.S. PATENT DOCUMENTS

| | | | | |
|---|---|---|---|---|
| 2006/0174720 | A1* | 8/2006 | Renken | G01D 9/005 73/866.1 |
| 2011/0308259 | A1* | 12/2011 | Wray | F16L 55/103 62/3.3 |
| 2013/0243032 | A1* | 9/2013 | Arunasalam | G01K 13/02 374/143 |
| 2014/0192840 | A1 | 7/2014 | Sun et al. | |
| 2014/0322897 | A1* | 10/2014 | Samir | H01L 21/67017 438/478 |
| 2016/0111279 | A1* | 4/2016 | Kaneko | C30B 29/36 438/492 |

* cited by examiner

INSTRUMENTED SUBSTRATE APPARATUS FOR ACQUIRING MEASUREMENT PARAMETERS IN HIGH TEMPERATURE PROCESS APPLICATIONS

CROSS-REFERENCE TO RELATED APPLICATION

The present application claims priority under 35 U.S.C. § 119(e) to U.S. Provisional Patent Application Ser. No. 62/290,153 entitled NESTED MODULE BASED INSTRUMENTED WAFER ASSEMBLY DESIGN FOR MEASURING TEMPERATURE IN EPITAXY CHAMBER, filed Feb. 2, 2016, naming Mei Sun and Vaibhaw Vishal as inventors, which is incorporated herein by reference in the entirety.

TECHNICAL FIELD

The present invention generally relates to monitoring of wafers along a semiconductor process line, and, in particular, to a multiple stage nested enclosure assembly allowing for operation at high temperature.

BACKGROUND

As tolerances on process conditions in semiconductor device processing environments continue to narrow, the demand for improved process monitoring systems continues to increase. Thermal uniformity within a processing system (e.g., epitaxy chamber) is one such condition. Current methods are unable to monitor temperature under the extreme conditions (e.g., high temperature) required of current processing techniques without contaminating the associated chamber. Therefore, it would be desirable to provide a system and method to allow for high temperature measurement using an instrumented wafer to monitor the conditions of a semiconductor device processing line.

SUMMARY

An apparatus for acquiring measurement parameters in high temperature process applications is disclosed, in accordance with one or more embodiments of the present disclosure. In one embodiment, the apparatus includes a substrate. In another embodiment, the apparatus includes a nested enclosure assembly including an outer enclosure and an inner enclosure. In another embodiment, the outer enclosure encloses the inner enclosure. In another embodiment, the inner enclosure encloses an electronic assembly. In another embodiment, an insulating medium is disposed within a cavity between the outer surface of the inner enclosure and the inner surface of the outer enclosure. In another embodiment, the apparatus includes a sensor assembly communicatively coupled to the electronic assembly. In another embodiment, the sensor assembly includes one or more sensors. In another embodiment, the one or more sensors are disposed at one or more locations of the substrate. In another embodiment, the one or more sensors are configured to acquire one or more measurement parameters at the one or more locations of the substrate. In another embodiment, the electronic assembly is configured to receive the one or more measurement parameters from the one or more sensors.

A method for acquiring measurement parameters in high temperature process applications is disclosed, in accordance with one or more embodiments of the present disclosure. In one embodiment, the method includes acquiring, with an electronic assembly disposed within a nested enclosure assembly, a plurality of measurement parameters from a plurality of sensors disposed at a plurality of locations across a substrate. In another embodiment, the nested enclosure assembly includes an outer enclosure and an inner enclosure. In another embodiment, the outer enclosure encloses the inner enclosure. In another embodiment, the inner enclosure encloses at least the electronic assembly. In another embodiment, the method includes storing, with the electronic assembly disposed within the nested enclosure assembly, the plurality of measurement parameters.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Figure 1A:
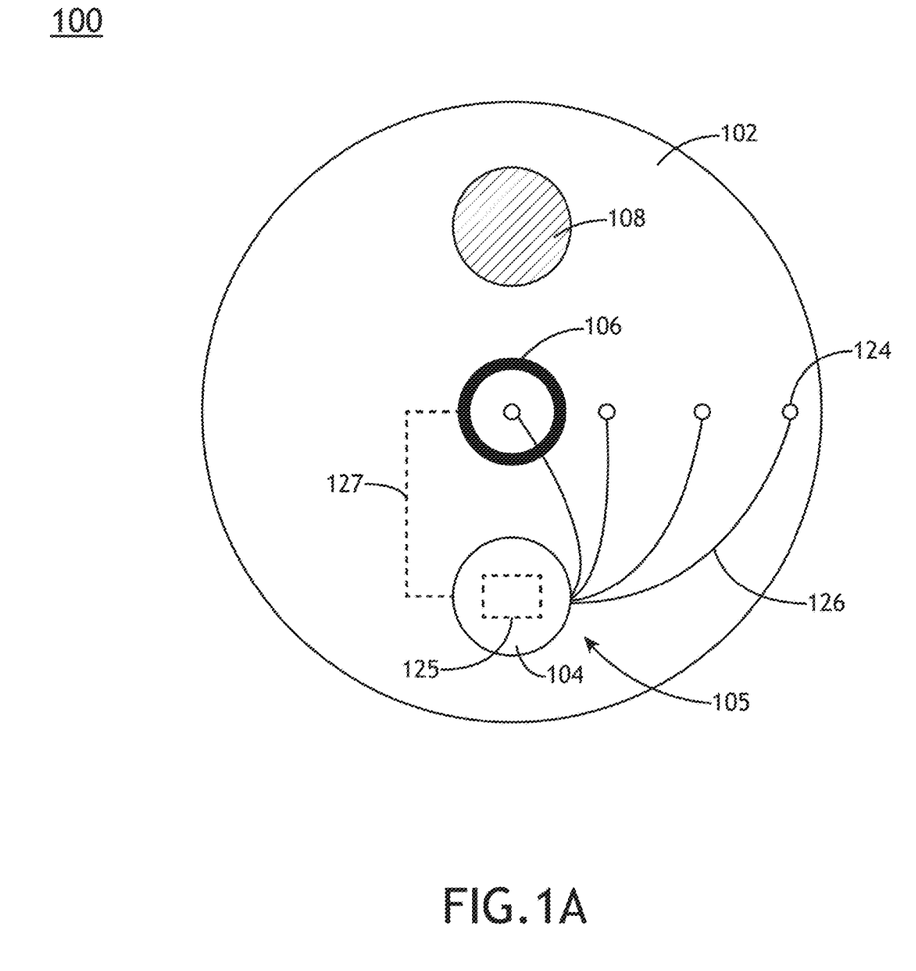
FIG. 1A is a top view of an instrumented substrate apparatus equipped with a nested enclosure assembly, in accordance with one or more embodiments of the present disclosure.
Figure 1B:
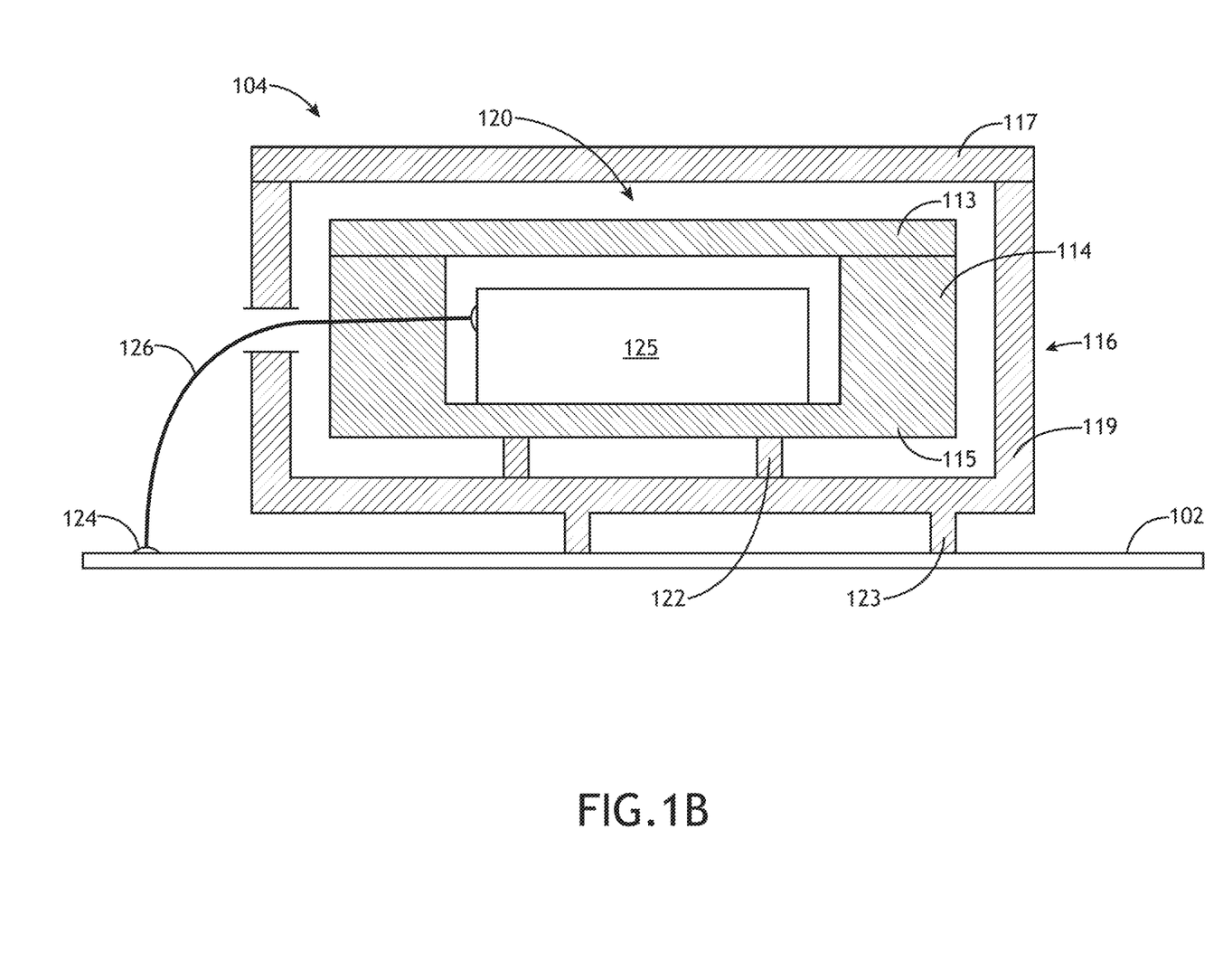
FIGS. 1B-1D are cross-sectional views of the nested enclosure assembly, in accordance with one or more embodiments of the present disclosure.
Figure 1C:
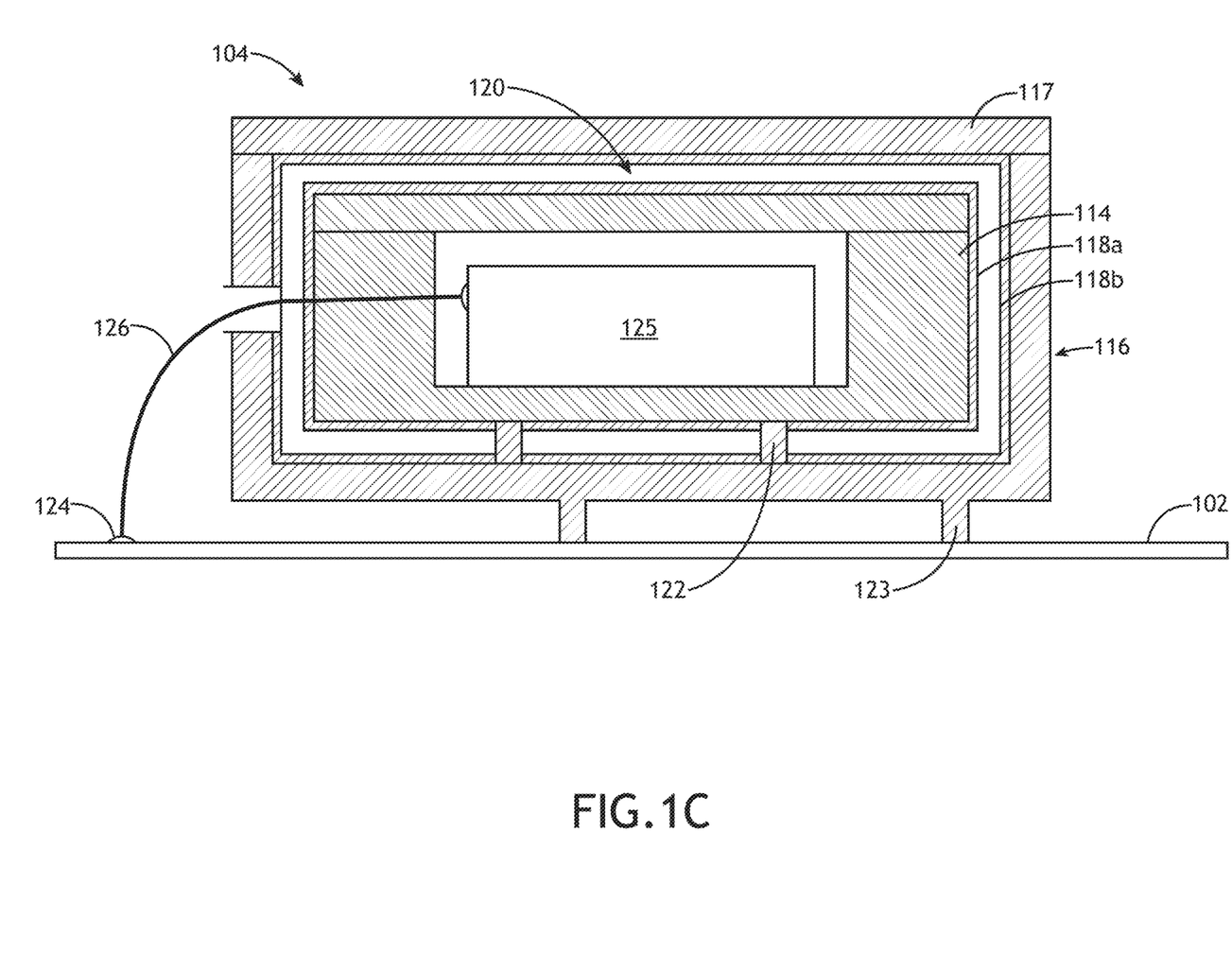
Figure 1D:
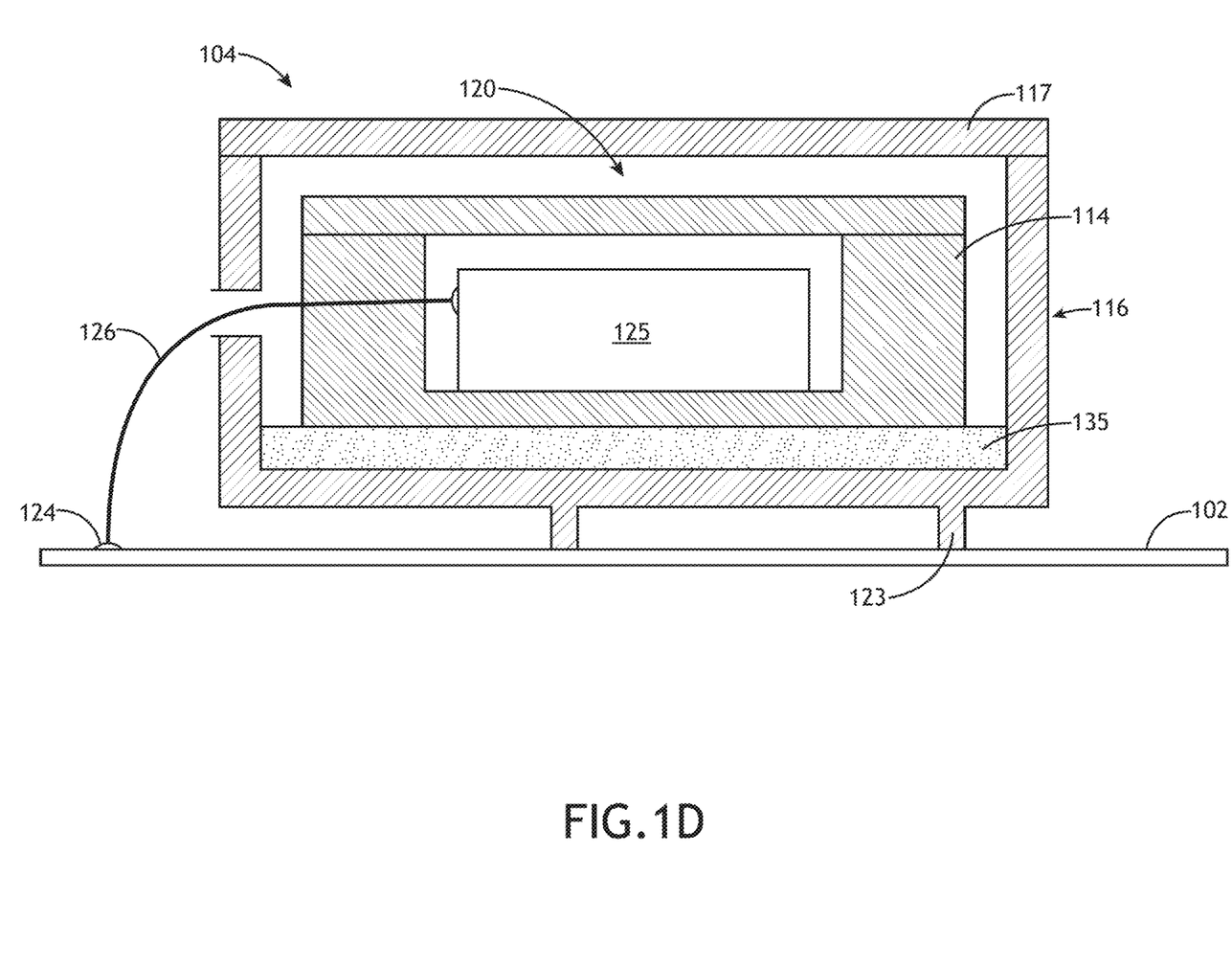
Figure 1E:
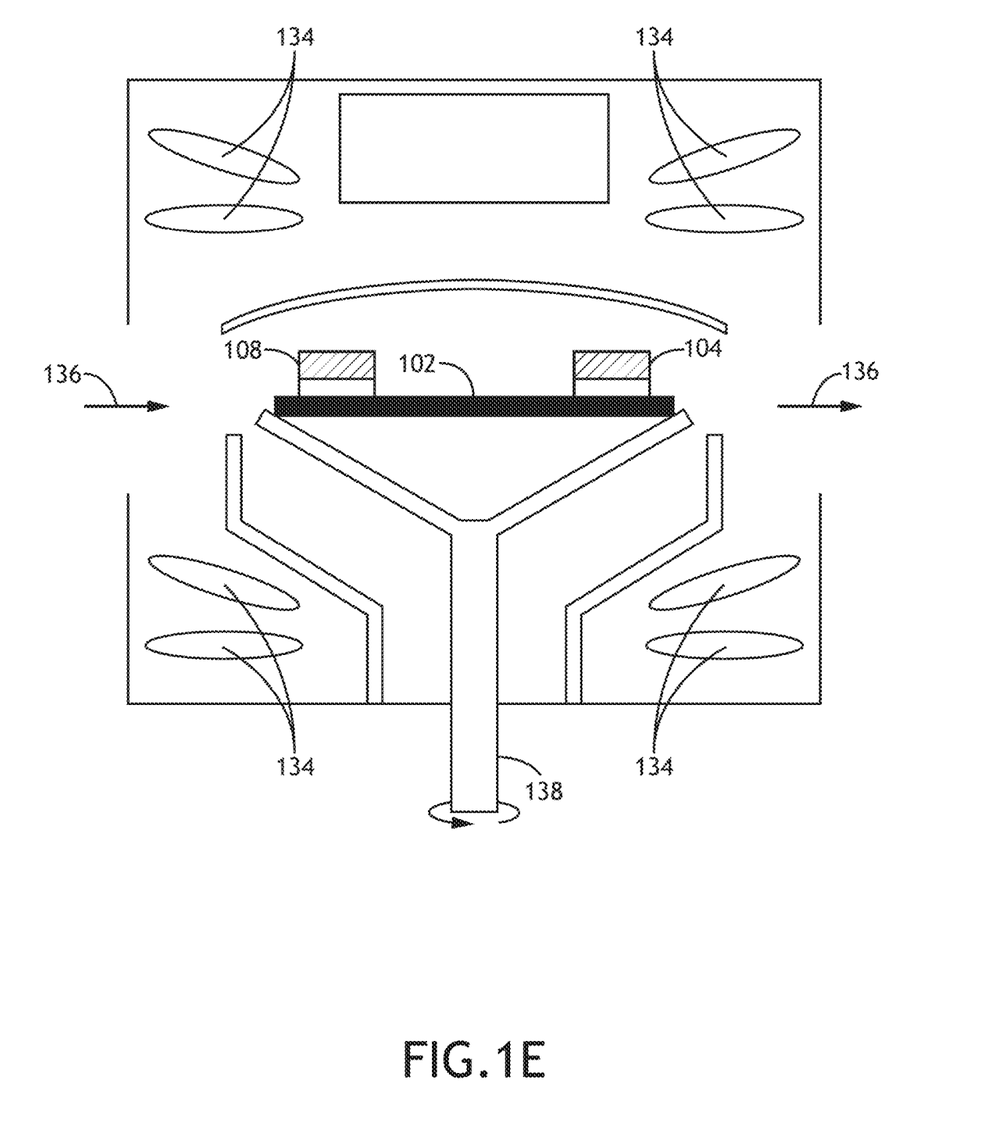
FIG. 1E is a block diagram of a process chamber including an instrumented substrate apparatus, in accordance with one or more embodiments of the present disclosure.
Figure 1F:
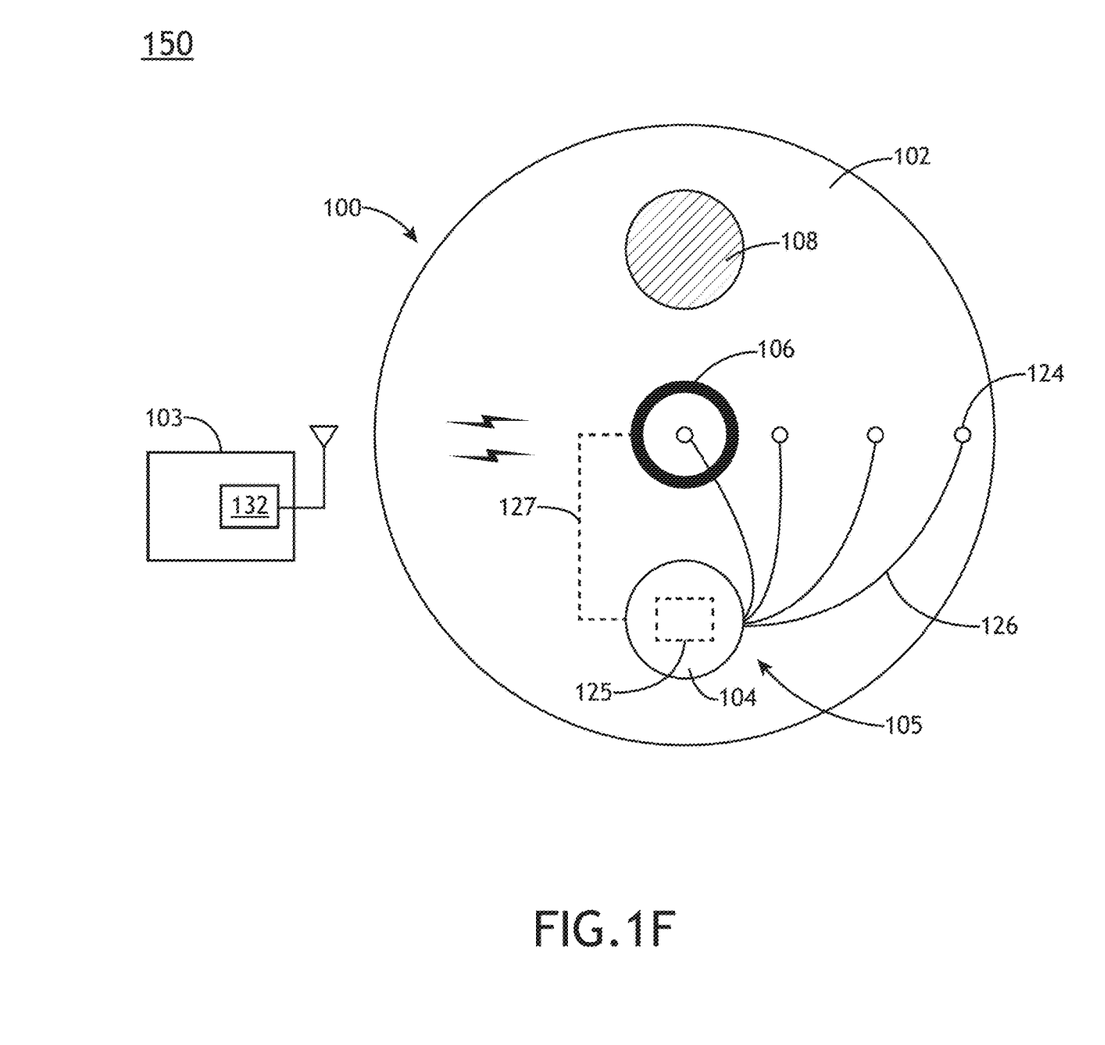
FIG. 1F is a top view of an instrumented substrate apparatus placed in communication with a remote data system, in accordance with one or more embodiments of the present disclosure.
Figure 1G:
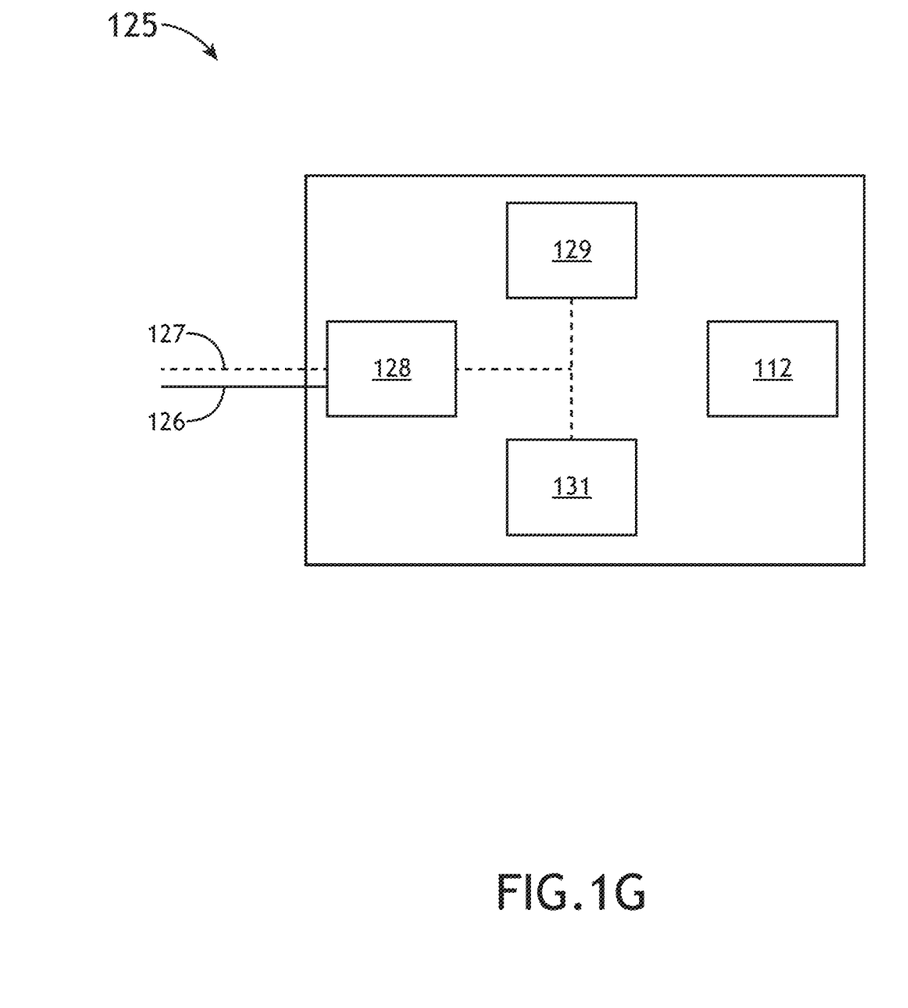
FIG. 1G is a block diagram view of the electronic assembly contained within the nested enclosure assembly, in accordance with one or more embodiments of the present disclosure.
Figure 2:
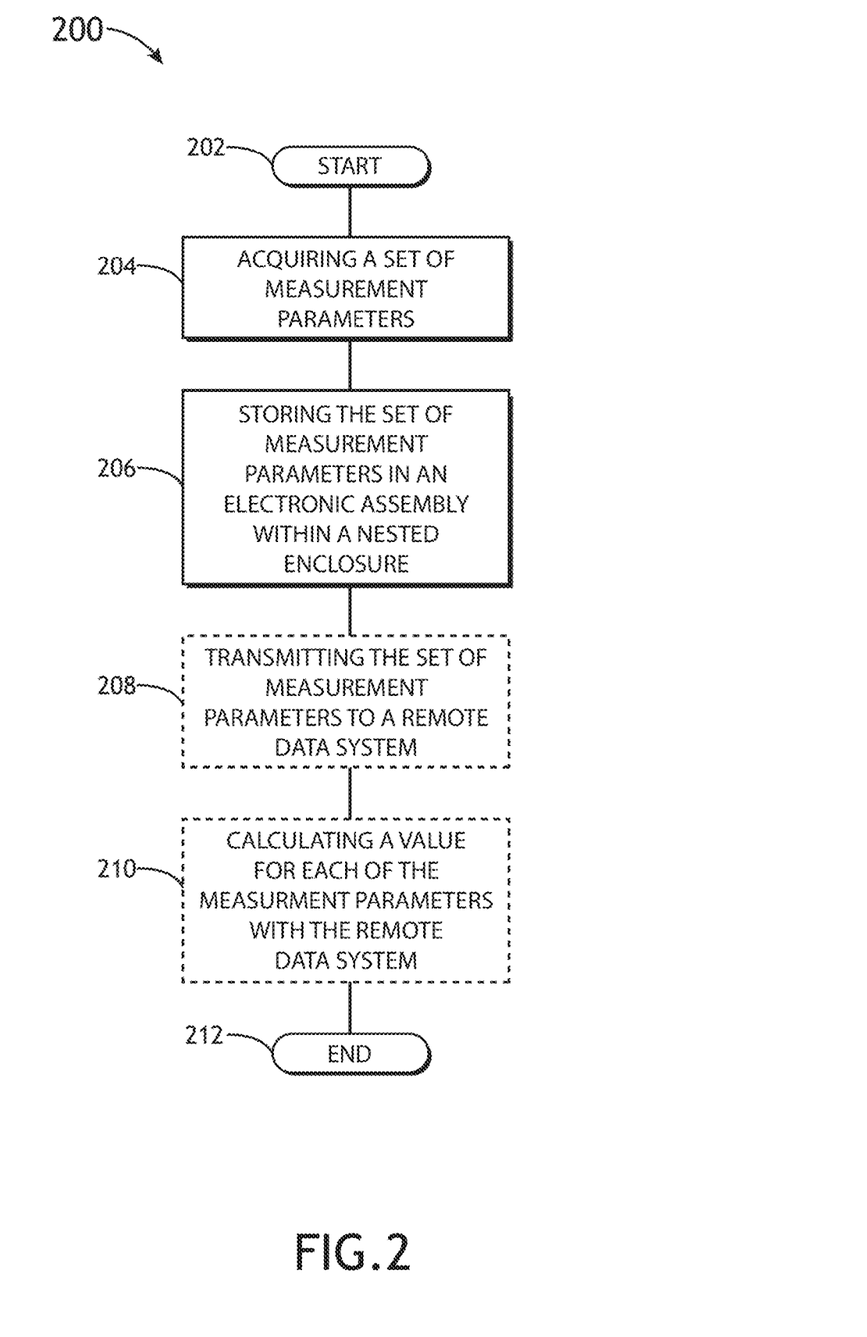
FIG. 2 is a flow diagram illustrating a method for acquiring measurement parameters across an instrumented substrate, in accordance with one or more embodiments of the present disclosure.

Referring generally to FIGS. 1A through 2, a system and method for acquiring measurement parameters across an instrumented substrate is described in accordance with the present disclosure.

Embodiments of the present disclosure are directed to an instrumented substrate apparatus capable of operating at high temperature (e.g., 600° C. to 800° C.). Such an instrumented substrate apparatus may be utilized within semiconductor processing chambers (e.g., epitaxy chamber) operating at high temperatures. In some embodiments, the instrumented substrate apparatus of the present disclosure includes a nested enclosure assembly including a first and second enclosure (e.g., heat shield), whereby the on-board electronics package (e.g., electronic assembly) and/or other sensitive devices are housed within the nested enclosure assembly so as to maintain the temperature of the electronics package at or below approximately 150° C., even when the instrumented substrate is exposed to temperatures as high as 800° C.

FIGS. 1A-1D illustrate the instrumented substrate apparatus 100 for acquiring measurement parameters across a substrate 102, in accordance with one or more embodiments of the present disclosure. FIG. 1A illustrates a top view of the instrumented substrate apparatus 100, while FIGS. 1B-1D illustrate a simplified cross-section view of the instrumented substrate apparatus 100.

In one embodiment the instrumented substrate apparatus 100 includes a substrate 102, a sensor assembly 105, and a nested enclosure assembly 104 containing an electronic assembly 125.

The substrate 102 may include any substrate known in the art of semiconductor processing. In one embodiment, the substrate 102 is a wafer. For example, the substrate 102 may include, but is not limited to, a semiconductor wafer (e.g., silicon wafer).

In one embodiment, as shown in FIG. 1B, the nested enclosure assembly 104 includes an inner enclosure 114 and an outer enclosure 116. For example, the inner enclosure 114 and outer enclosure 116 may consist of an inner heat shield and an outer heat shield respectively. In another embodiment, the electronic assembly 125 (e.g., processor(s), memory, power source, communication circuitry and etc.) may be disposed within the inner enclosure 114, whereby the inner enclosure 114 is disposed within the outer enclosure 116 to form a nested enclosure structure.

In one embodiment, the inner enclosure 114 is formed from a material having a high heat capacity (e.g., by volume). For example, the inner enclosure 114 may be formed from one or more metal alloys, such as, but not limited to, an iron-nickel-cobalt alloy, a nickel-iron alloy, or an iron-carbon alloy. For instance, the inner enclosure 114 may be formed from one or more of the materials including KOVAR, INVAR, or stainless steel. In the case of the inner enclosure being formed from KOVAR, the electronic assembly 125 (and the components of the electronic assembly 125) of the inner enclosure 114 closely follow the temperature of the inner enclosure 114. By way of another example, the inner enclosure 114 may be formed from one or more crystalline materials, such as, but not limited to, sapphire or crystalline quartz.

In another embodiment, the outer enclosure 116 is formed from one or more materials including, but not limited to, a ceramic, a composite, or a glass. For example, the outer enclosure 116 may be formed from fused-silica. In another embodiment, the outer enclosure 116 is formed from a material causing negligible contamination. For example, the outer enclosure 116 may be formed from one or more low contamination materials including, but not limited to, silicon, silicon carbide, silicon nitride, or silicon oxide.

In one embodiment, the inner enclosure 114 includes a lid 113 and a base 115, whereby the lid 113 may be removed from the base 115 to allow access to the internal portion of the inner enclosure 114. In another embodiment, the outer enclosure 116 includes a lid 117 and a base 119, whereby the lid 117 may be removed from the base 119 to allow access to the internal portion of the outer enclosure 116.

In another embodiment, the nested enclosure assembly 104 includes an insulating medium 120 disposed between the inner enclosure 114 and outer enclosure 116. It is noted that the implementation of an insulating medium 120 between the inner and outer enclosures 114, 116 serves to reduce heat transfer from the elevated temperature environment (e.g., semiconductor processing chamber) outside of the outer enclosure to the region within the inner enclosure 114. For example, an insulating medium 120 may be disposed within a cavity between the outer surface of the inner enclosure 114 and the inner surface of the outer enclosure 116. In another embodiment, the insulating medium 120 may include, but is not limited to, a porous solid material. For example, the insulating medium 120 may be one or more aerogel materials (e.g., silica aerogel material). For example, an aerogel material can be formed with a porosity as high as approximately 98.5%. By way of another example, the insulating medium 120 may be a ceramic material (e.g., porous ceramic material). It is noted herein that during the sintering of a ceramic-based insulating medium the porosity may be controlled through the use of pore formers. It is further noted herein that the porosity of a ceramic material may be fabricated with a porosity range of 50-99%. For example, the porosity of a ceramic material may be fabricated to have a porosity range between 95-99%.

In another embodiment, the insulating medium 120 is opaque. For example, the insulating medium 120 may include, but is not limited to, a material that is absorptive of radiation traversing the volume between the inner surface of the outer enclosure 116 and the outer surface of the inner enclosure 114. For instance, the insulating medium 120 may include, but is not limited to, a carbon-doped aerogel material.

In another embodiment, the insulating medium 120 is low pressure gas (i.e., gas held at vacuum pressure), whereby the gas is maintained at a pressure less than ambient pressure (i.e., pressure of process chamber). In this regard, the volume between the outer surface of the inner enclosure 114 and the inner surface of the outer enclosure 116 may be maintained at a vacuum pressure so as to minimize heat conduction from the outer enclosure 116 and the inner enclosure 114. In another embodiment, the insulating medium 120 is a gas maintained at pressure approximately equal to ambient pressure, but less than atmospheric pressure. In another embodiment, the insulating medium 120 is a gas maintained at pressure higher than ambient pressure, but less than atmospheric pressure. For the purposes of the present disclosure, "vacuum pressure" is interpreted to mean any pressure that is lower than ambient pressure.

In one embodiment, as shown in FIG. 1B, the inner enclosure 114 is supported on the internal surface of the outer enclosure 116 by one or more support structures 122. For example, the one or more support structures 122 may include, but are not limited to, one or more legs or one or more platforms. In another embodiment, the one or more support structures 122 (e.g., a single support structure or multiple support structures) may be formed from a material having a low thermal conductivity coefficient so as to limit the heat transfer between the outer enclosure 116 and the inner enclosure 114. For example, the one or more support structures 122 may be formed from one or more metal alloys, such as, but not limited to, an iron-nickel-cobalt alloy, a nickel-iron alloy, or an iron-carbon alloy. For instance, the one or more support structures 122 may be formed from one or more of the materials including KOVAR, INVAR, or stainless steel. In another embodiment, the one or more support structures 122 may be formed from one or more materials including, but not limited to, a ceramic, a composite or a glass. For example, the one or more support structures 122 may be formed from a low thermal conductivity material such as, but not limited to silicon, silicon carbide, silicon nitride, or silicon oxide.

In one embodiment, as shown in FIG. 1B, the outer enclosure 116 is supported on the substrate 102 by one or more support structures 123. In another embodiment, the one or more support structures 123 (e.g., single support leg, multiple support legs) may be formed from a material having a low thermal conductivity coefficient so as to limit the heat transfer between the substrate 102 and the outer enclosure 116. For example, the one or more support structures 123 may be formed from a low thermal conductivity material such as, but not limited to, a ceramic, a composite, a crystalline material or a glass. For instance, the one or more support structures 123 may be formed from a low thermal conductivity material such as, but not limited to, silicon, silicon carbide, silicon nitride, or silicon oxide.

In another embodiment, as shown in FIG. 1C, a low emissivity and/or high reflectivity layer 118a (e.g., coating) is disposed on the outer surface of the inner enclosure 114. In another embodiment, a low emissivity and/or high reflectivity layer 118b (e.g., coating) is disposed on the inner surface of the outer enclosure 116. In another embodiment, the low emissivity and/or high reflectivity layer 118a is disposed on the insulating medium 120 disposed next to the outer surface of the inner enclosure 114. In another embodiment, the low emissivity and/or high reflectivity layer 118a is disposed on the insulating medium 120 disposed next to the inner surface of the outer enclosure 116.

It is noted herein that, in the case of a high reflectivity layer disposed next to the inner surface of the outer enclosure 116, the high reflectivity layer 118b serves to reflect most of the thermal radiation falling onto the outer enclosure 116 from the processing chamber walls or any radiation lamp that may be present in the processing chamber. Further, the presence of a high reflectivity layer disposed next to the outer surface of the inner enclosure 114 serves to reflect most of the thermal radiation falling onto the inner enclosure 114 from the inner surface of the outer enclosure 116. In addition, the utilization of a low emissivity material disposed next to the inner surface of the outer enclosure 116 serves to reduce the amount of radiant thermal energy emitted by the outer enclosure 116, thereby reducing the amount of available radiant thermal energy that could be absorbed by the inner enclosure 114. Further, the utilization of a low emissivity material disposed next to the inner surface of the outer enclosure 116 serves to reduce the amount of radiant thermal energy emitted by the inner enclosure 114, thereby reducing the amount of available radiant thermal energy that could be transferred to the electronic assembly 125 within the inner enclosure 114.

In another embodiment, the layer 118a and/or 118b are high reflectivity and low emissivity materials such as, but not limited to, gold, silver, or aluminum. In another embodiment, the layer 118a and/or 118b may be a high reflectivity and low emissivity material formed from a stacked dielectric film. For example, the layer 118a and/or 118b may be a high reflectivity and low emissivity stacked dielectric film formed from materials including, but not limited to, oxides, carbides, or nitrides.

In another embodiment, as shown in FIG. 1D, the one or more support structures 122 may include a layer of material formed between the bottom surface of the inner enclosure 114 and the bottom surface of the outer enclosure 116. For example, the inner enclosure 114 may be supported by a layer 135 of low thermal conductivity material disposed on the internal bottom surface of outer enclosure 116. For instance, the layer of low thermal conductivity material may include one or more porous materials (e.g., aerogel material or porous ceramic material).

Referring again to FIG. 1A, in one embodiment, the electronic assembly 125 is coupled to the sensor assembly 105. In another embodiment, the sensor assembly 105 includes one or more sensors 124. In another embodiment, the sensors 124 are disposed at one or more locations across the substrate 102 and connected to the electronic assembly 125 via one or more wireline connections 126. In this regard, the one or more electronic assemblies 125 may acquire one or more measurement parameters (e.g., voltage from thermocouple, resistance from resistance temperature device, voltage (or other signal) from a pressure sensor, voltage (or other signal) from a radiation sensor, voltage (or other signal) from a chemical sensor and the like) from the one or more sensors 124 located at one or more locations of the substrate 102. Further, the measurement parameters acquired by the electronic assembly 125 enclosed within the nested enclosure assembly 104 are stored in memory 131 of the electronic assembly 125. In another embodiment, the electronic assembly 125 is communicatively coupled to a remote data system 103. In another embodiment the electronic assembly 125 transmits a plurality of measurement parameters to a remote data system 103.

It is noted that the one or more sensors 124 may include any measurement device known in the art. For example, the one or more sensors 124 may include, but are not limited to, a thermal sensor, a pressure sensor, a radiation sensor and/or a chemical sensor. For instance, in the case of temperature measurements, the one or more sensors 124 may include, but are not limited to, one or more thermocouple (TC) devices (e.g., thermoelectric junction) or one or more resistance temperature devices (RTDs) (e.g., thin film RTD). In another instance, in the case of pressure measurements, the one or more sensors 124 may include, but are not limited to, a piezoelectric sensor, a capacitive sensor, an optical sensor, a potentiometric sensor and the like. In another instance, in the case of radiation measurements, the one or more sensors may include, but are not limited to, one or more light detectors (e.g., photovoltaic cell, photoresistor and the like) or other radiation detectors (e.g., solid state detector). In another instance, in the case of chemical measurements, the one or more sensors 124 may include, but are not limited to, one or more chemiresistors, gas sensors, pH sensors and the like.

In one embodiment, as shown in FIG. 1E, the instrumented substrate apparatus 100 is disposed on a rotatable platform 138. In another embodiment, the instrumented substrate apparatus 100 includes a dummy enclosure assembly 108. For example, a dummy enclosure assembly 108 may be placed at a selected position on the substrate 102 so as to serve as a counterbalance weight to offset the weight of the nested enclosure assembly 104. For instance, the dummy enclosure assembly 108 may be placed opposite to the nested enclosure assembly 104 at the same distance from the center of the substrate 102 as the nested enclosure assembly 104. It is noted herein that placement of the dummy enclosure assembly 108 at a position opposite of the nested enclosure assembly 104 serves to maintain the center of mass of the instrumented substrate apparatus 100 at the center of the substrate 102. In another embodiment, although not shown, the nested enclosure assembly 104 may be positioned at the center of the substrate 102 so as to maintain the center of mass of the instrumented substrate apparatus 100 at the center of the substrate 102. In another embodiment, process chamber gases 136 flow over the substrate 102. In another embodiment, one or more heating sources 134 are used to heat the process chamber. For example, heating lamps above and below the instrumented substrate apparatus 100 heat the process chamber.

FIG. 1F illustrates the instrumented substrate assembly system 150 including the instrumented substrate apparatus 100 and a remote data system 103, in accordance with one or more embodiments of the present disclosure. In one embodiment, the one or more electronic assemblies 125 are wirelessly communicatively coupled to the remote data system 103. The one or more electronic assemblies 125 may be wirelessly communicatively coupled to the remote data system 103 in any suitable manner. For example, the instrumented substrate apparatus 100 may include communication circuitry 106. The communication circuitry 106 may include any communication circuitry and/or communication device known in the art of communication. For instance, the communication circuitry 106 may include, but is not limited to, one or more communication antennae (e.g., communication coils). In one embodiment, the communication circuitry 106 is configured to establish a communication link between the electronic assembly 125 and the off-substrate remote data system 103. Further, the communication circuitry 106 is communicatively coupled to the electronic assembly 125 (e.g., coupled via electrical interconnect 127). In this regard, the electronic assembly 125 may transmit one or more signals indicative of the measurement parameters acquired by the one or more sensors 124 to the communication circuitry 106 via one or more electrical interconnects 127. In turn, the communication circuitry 106 may relay one or more signals indicative of the measurement parameters to the remote data system 103. In one embodiment, the remote data system 103 includes communication circuitry 132 suitable for establishing the communication link between the on-substrate communication circuitry 106 and the remote data system 103. For example, the communication circuitry 132 may establish the communication link between the on-substrate communication circuitry 106 and the remote data system 103 using a radio frequency (RF) signal. As discussed further herein, the values associated with the sensor measurement parameters may be calculated by the electronic assembly 125 and/or the remote data system 103.

In one embodiment, the electronic assembly 125 calculates one or more values based on the one or more measurement parameters acquired by the one or more sensors 124. In turn, the electronic assembly 125 may transmit the calculated values to the remote data system 103. In another embodiment, the values are calculated by the remote data system 103. In this regard, the electronic assembly 125 transmits one or more measurement parameters to the remote data system 103. In turn, the remote data system 103 may calculate one or more values based on the one or more measurement parameters acquired by the sensors 124.

In another embodiment, the remote data system 103 maps (or correlates) the one or more values calculated by the electronic assembly 125 or the remote data system 103 based on the one or more signals acquired by sensors 124 to the position of acquisition on the substrate 102. In another embodiment, the remote data system 103 reports the mapped values to a user interface. For example, the remote data system 103 may report mapped values to one or more of a desktop computer, laptop, tablet, handheld device, memory or a server.

FIG. 1G illustrates a block diagram of the electronic assembly 125, in accordance with one or more embodiments of the present disclosure. In one embodiment, the electronic assembly 125 includes a power source 112 (e.g., one or more batteries). In another embodiment, the electronic assembly 125 includes one or more processors 129. In another embodiment, the electronic assembly 125 includes communication circuitry 128. In another embodiment, the electronic assembly 125 may include a memory medium 131 (e.g., memory) for storing the program instructions to configure the one or more processors 129 and/or the measurement results received from the one or more sensors 124. For the purposes of the present disclosure, the term 'processor' may be broadly defined to encompass any device having one or more processors (e.g., CPU) or logic elements (e.g., ASICs), which execute instructions from a memory medium 131. In this sense, the one or more processors 129 of the electronic assembly 125 may include any microprocessor-type or logic device configured to execute algorithms and/or instructions. It should be recognized that the steps described throughout the present disclosure may be carried out by a single processor or, alternatively, multiple processors. The memory medium 131 may include a read-only memory, a random access memory, a solid state drive, flash, EPROM, EEPROM, or the like.

FIG. 2 illustrates a flow diagram depicting a method 200 of acquiring measurement parameters across a substrate, in accordance with one or more embodiments of the present disclosure. It is noted herein that the steps of the flow diagram in FIG. 2 are not to be interpreted as limiting and are provided merely for illustrative purposes.

In one embodiment, the process starts at step 202. In step 204, the process includes acquiring a set of measurement parameters from a set of sensors 124 disposed about the substrate 102 at a plurality of locations. For example, the set of sensors 124 may include any set of sensors described previously herein. For instance, the set of sensors 124 may include, but is not limited to, a set of thermal sensors disposed at a set of locations across the substrate 102. In this instance, the thermal sensors may acquire a set of parameters indicative of temperature (e.g., TC voltage, RTD resistance and the like). Then, in step 206, after the measurement parameter is measured, the result is stored in memory (e.g., memory 131 of electronic assembly 125) enclosed in the nested enclosure. In step 208, the plurality of measurement parameters are transmitted to the remote data system 103. For example, the measurement data may be wirelessly transmitted from the electronic assembly 125 to the remote data system 103 via communication circuitry 106 (e.g., communication antenna) by a radio frequency (RF) signal. In step 210, the value of each measurement parameter is calculated by the remote data system 103 for each of the measurement parameters acquired by the plurality of sensors 124 disposed at a plurality of locations on the substrate 102. For example, in the case of a temperature measurement, the temperature associated with one of the sensors 124 may be calculated based on the measurement parameter indicative of temperature at that sensor. It is noted herein that the results for each of the sensors 124 are mapped to the surface of the substrate 102. For example, the remote data system 103 (or another data system) may correlate the values measured for each sensor of the set of sensors 124. Then, based on the known position of each of the sensors 124 the remote data system 103 can form a database and/or map of the values at the top surface of the substrate 102 as a function of position in the plane of the top surface (e.g., X-Y position) of the substrate 102. In another embodiment, the database and/or map of values is presented on a display of a user interface (not shown). In step 212, the process ends.

It is recognized that steps of the method 200 may be carried out via system 150. It should, however, be recognized that the system 150 should not be interpreted as a limitation on method 200 or the method of measuring values across a substrate 102 as it is contemplated that a variety of processes may be carried out by system 150 resulting in a plurality of process flows to acquire measurements and determine values at a plurality of locations on a substrate 102. For example, after measurement parameters have been acquired for all of the one or more sensors 124 the electronic assembly 125 may calculate a value for each measurement parameter acquired by the one or more sensors 124.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An apparatus comprising:
    a wafer, wherein the wafer is compatible with a semiconductor processing chamber;
    an electronic assembly;
    a nested enclosure assembly including an outer enclosure formed from fused silica and an inner enclosure, wherein the outer enclosure encloses the inner enclosure, wherein the inner enclosure encloses at least the electronic assembly, wherein the nested enclosure assembly and the electronic assembly are disposed on the wafer;
    an insulating medium disposed within a cavity between an outer surface of the inner enclosure and an inner surface of the outer enclosure, wherein the inner enclosure, the outer enclosure, and the insulating medium are configured to maintain the electronic assembly at or below a temperature of 150° C. when the nested enclosure assembly is exposed to a processing environment having a temperature up to 800° C.; and
    a sensor assembly communicatively coupled to the electronic assembly, wherein the sensor assembly includes two or more sensors, wherein the two or more sensors include a first sensor disposed at a first location of the wafer and a second sensor disposed at a second location of the wafer different from the first location, wherein the two or more sensors are configured to acquire one or more measurement parameters at the two or more locations of the wafer, wherein the electronic assembly is configured to receive the one or more measurement parameters from the two or more sensors.

2. The apparatus of claim 1, wherein at least one of the two or more sensors comprises:
    one or more temperature sensors configured to acquire one or more parameters indicative of temperature.

3. The apparatus of claim 2, wherein at least one of the two or more temperature sensors comprises:
    one or more thermocouple devices.

4. The apparatus of claim 2, wherein at least one of the two or more temperature sensors comprises:
    one or more resistance temperature devices.

5. The apparatus of claim 1, wherein at least one of the two or more sensors comprises:
    one or more pressure sensors configured to acquire one or more parameters indicative of pressure.

6. The apparatus of claim 1, wherein at least one of the two or more sensors comprises:
    one or more chemical sensors configured to acquire one or more parameters indicative of a presence of a targeted chemical.

7. The apparatus of claim 1, wherein at least one of the two or more sensors comprises:
    one or more radiation sensors configured to acquire one or more parameters indicative of a presence of radiation.

8. The apparatus of claim 1, wherein the electronic assembly comprises:
    one or more processors;
    communication circuitry;
    memory; and
    a power source.

9. The apparatus of claim 1, further comprising:
    a dummy enclosure assembly, wherein the dummy enclosure assembly is disposed at a position on the wafer to maintain a center of mass of the apparatus at a center of the wafer.

10. The apparatus of claim 1, wherein the insulating medium comprises:
    a porous solid material.

11. The apparatus of claim 10, wherein the insulating medium is opaque.

12. The apparatus of claim 11, wherein the insulating medium is absorptive.

13. The apparatus of claim 10, wherein the insulating medium comprises:
    an aerogel.

14. The apparatus of claim 10, wherein the insulating medium comprises:
    a ceramic material.

15. The apparatus of claim 1, wherein the insulating medium comprises:
    one or more gases.

16. The apparatus of claim 15, wherein the one or more gases is maintained at a pressure less than atmospheric pressure.

17. The apparatus of claim 16, wherein the one or more gases is maintained at a pressure less than ambient pressure.

18. The apparatus of claim 1, further comprising:
    one or more support structures supporting the inner enclosure on the internal surface of the outer enclosure.

19. The apparatus of claim 18, wherein the one or more support structures are formed from a thermal insulating material.

20. The apparatus of claim 1, further comprising:
a layer of thermal insulating material disposed between an outer surface of a bottom portion of the inner enclosure and an inner surface of a bottom portion of the outer enclosure.

21. The apparatus of claim 1, further comprising:
one or more support structures for supporting the outer enclosure on the substrate.

22. The apparatus of claim 21, wherein the one or more support structures are formed from a thermal insulating material.

23. The apparatus of claim 1, wherein the inner enclosure is formed from a material having a heat capacity above a selected value.

24. The apparatus of claim 1, wherein the inner enclosure is formed from at least one of a metal, an alloy or a composite.

25. The apparatus of claim 24, wherein the inner enclosure is formed from at least one of an iron-nickel-cobalt alloy, an iron-nickel alloy, or an iron-carbon alloy.

26. The apparatus of claim 1, wherein the inner enclosure is formed from one or more crystalline materials.

27. The apparatus of claim 26, wherein the inner enclosure is formed from at least one of sapphire or crystalline quartz.

28. The apparatus of claim 1, wherein the outer enclosure is formed from a material having a contamination rate below a selected level.

29. The apparatus of claim 1, wherein the outer enclosure is formed from at least one of silicon, silicon carbide, silicon nitride or silicon dioxide.

30. The apparatus of claim 1, further comprising:
at least one of a high reflectivity layer disposed on the outer surface of the inner enclosure or a high reflectivity layer disposed on the inner surface of the outer enclosure.

31. The apparatus of claim 30, wherein the high reflectivity layer includes at least one of gold, silver or aluminum.

32. The apparatus of claim 30, wherein the high reflectivity layer is a stacked dielectric film comprising at least one of an oxide, a nitride or a carbide.

33. The apparatus of claim 1, wherein the electronic assembly is configured to calculate one or more values from the one or more acquired measurement parameters.

34. The apparatus of claim 1, further comprising:
a remote data system communicatively coupled to the electronic assembly, wherein the electronic assembly is configured to transmit the one or more measurement parameters to the remote data system.

* * * * *